June 11, 1929.  K. C. HICKMAN  1,716,441
FILM INSPECTION MEANS
Filed Aug. 28, 1925
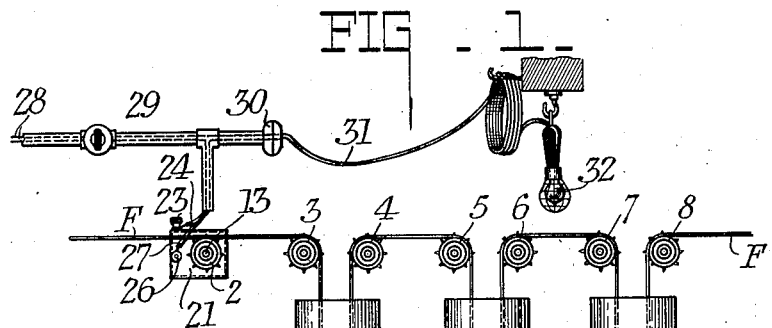
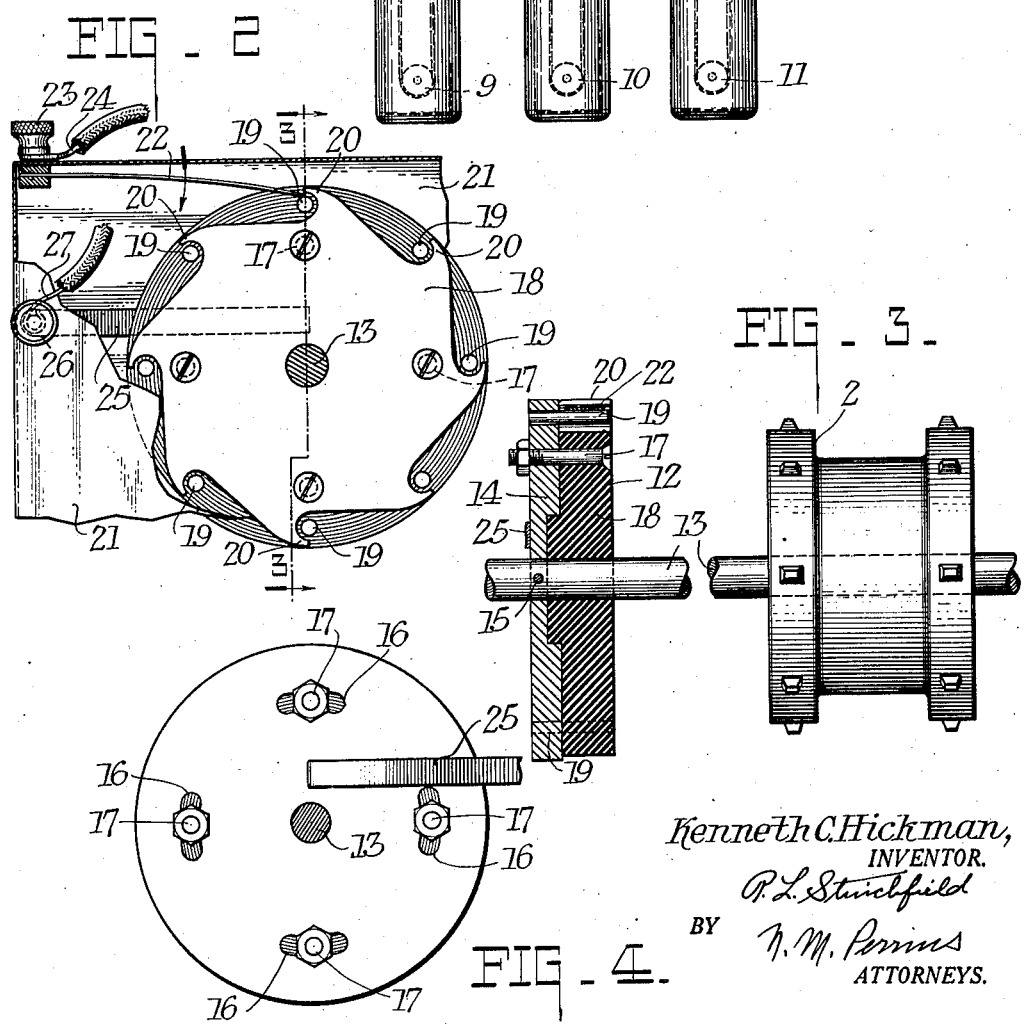
Kenneth C. Hickman,
INVENTOR.
BY
ATTORNEYS.

Patented June 11, 1929.

1,716,441

UNITED STATES PATENT OFFICE.

KENNETH C. HICKMAN, OF ROCHESTER, NEW YORK, ASSIGNOR TO EASTMAN KODAK COMPANY, OF ROCHESTER, NEW YORK, A CORPORATION OF NEW YORK.

FILM-INSPECTION MEANS.

Application filed August 28, 1925. Serial No. 53,051.

This invention relates to motion picture photography and more particularly to a device for examining moving film where it is desired to inspect the quality or condition of the images thereon.

It is customary to pass the film in a long strip continuously through a processing machine. If the operator wishes to inspect the film to see how the particular process is progressing with regard to the images, he must either stop the film at some point in order to inspect a short length thereof, or he must let his eye travel with the film. Both of these methods are open to obvious disadvantages.

In such machines, it is common to have a series of sprockets engaging the film and having a circumference equal to a definite multiple of the length of a picture area. I propose to connect with one of these sprockets a commutator which will control an electric circuit in such a way as to close it momentarily once for each picture area. In the circuit is a lamp having the property of flashing momentarily when current is supplied for an extremely short interval and which will, therefore, flash in timed relation with the movement of the film,—that is, it will flash once for each movement of the film by a distance equal to that of a picture area. Film viewed by such a light will have the appearances of being stationary with moving images thereon. Other objects and features of my invention will appear in the following description, reference being made to the accompanying drawing, in which Fig. 1 is a schematic view of a processing machine embodying my invention.

Fig. 2 is a view of the commutator switch.

Fig. 3 shows an end view of a sprocket and a section of the commutator connected thereto, taken on line 3—3 of Fig. 2.

Fig. 4 is a view of the rotating member of the commutator switch viewed from the side opposite to that shown in Fig. 2.

In Fig. 1 are indicated schematically certain features of a processing machine there being shown a series of tanks 1, through which a film F passes, being driven by sprockets 2, 3, 4, 5, 6, 7 and 8. Between certain of the sprockets it depends in loops around idler rolls 9, 10 and 11 in the several tanks, the number of tanks and loops being immaterial and their arrangement being in any one of the numerous forms already known.

Connected to the sprocket 2 which may be positioned at any point in the machine is a rotating commutator switch member 12, here shown as attached to the shaft 13 carrying the sprocket 2. This commutator consists of a metal disk 14 connected to the shaft by pin 15 and having a series of slots 16 through which pass bolts 17 which hold upon the disk 14 an insulating disk 18 and permit of the angular adjustment of the two disks. The disk 14 carries a series of metal pins 19 equally spaced near the circumference. In the sprocket shown, there are eight teeth spaced apart by the length of a picture area upon the film and the number of contacts 19 is the same as the number of teeth. The disk 18 has peripherial ledges or abutments 20 curved around and overhanging the contacts 19. The rotating commutator member 12 is in a housing 21 which is of non-conducting material. A spring contact 22 is connected to a binding post 23 on the frame and this also secures a wire 24. The spring 22 contacts the periphery of the disk 18 against which it has a normal tension in the direction of the arrow indicated in Fig. 2.

A second spring 25 bears laterally against the side of the metal disk 14 and is connected to a binding post 26 carried on the frame 21 and securing a wire terminal 27.

Service wires 28 from a suitable source of current and controlled by a switch 29 are connected to a plug 30, one of the wires being broken, with its ends terminating in the above described connections 24 and 27. Connected to the plug 30, which ordinarily would be in the fixed furniture of the room, is the ordinary two-wire flexible cable 31 at the end of which is a lamp 32 of a type capable of responding very quickly to makes and breaks in the circuit such as a lamp filled with neon of a type now on the market. This lamp could obviously be moved to any portion of the room and the apparatus can be placed either above or below the film whereby the latter may be viewed either by reflected or transmitted light.

As the commutator disk turns in a clockwise direction in Fig. 2, the spring 22 will rise on the shoulders 20 and slip suddenly past the contacts 19, closing the circuits for momentary intervals only. The extent of the contact may be adjusted by relative movements of the disks by means of the bolts 17.

It is to be understood that the above disclosure is by way of example and that I contemplate as included in my invention all such modifications and equivalents as fall within the terms of the appended claims.

Having thus described my invention, what I claim as new and desire to secure by Letters Patent is:

1. In combination with a machine for the fluid treatment of motion picture film and in which the film is accessible for inspection at a plurality of points and comprising means for advancing film at a continuous uniform speed throughout the machine, a device for making and breaking an electric circuit in timed relation to the movement of the film and at uniform intervals of time and at the rate of at least several per second, and a circuit including said device, an electric lamp and a source of current, the lamp being mounted on a movable carrier whereby the film at selected accessible points in the machine may be examined thereby.

2. In combination with a machine for the fluid treatment of motion picture film and in which the film is accessible for inspection at a plurality of points and comprising means for advancing film at a continuous uniform speed throughout the machine, a device for momentarily closing an electric circuit at uniform intervals in timed relation to the movement of the film, and a circuit including said device, an electric lamp and a source of current, the lamp being mounted on a movable carrier whereby it may be moved for the examination of film by the flashing light therefrom at selected accessible points in the machine, the intervals being sufficiently short to cause images on the viewed film to produce a motion picture effect.

3. In combination with a machine for the fluid treatment of motion picture film and in which the film is accessible for inspection at a plurality of points and comprising means for advancing film at a uniform rate through the machine, a lamp, a movable support whereby the lamp may be moved to various accessible points on the machine for the examination of the moving film, and means controlling the illumination from the lamp whereby rays therefrom will fall on the film only at regularly timed momentary intervals, the intervals being so short that images on the viewed film will produce a motion picture effect.

4. In combination with a machine for fluid treatment of motion picture film having a longitudinal series of uniform picture areas and a corresponding series of perforations, said machine having a plurality of positions at which the film is accessible for inspection and comprising also a sprocket having teeth adapted to engage such perforations and thereby to move the film continuously, the periphery of the sprocket being a multiple of the length of a picture area, a commutator coaxial with the sprocket and having a number of contacts corresponding to the multiple mentioned and rotatable with the sprocket, an electric circuit including a lamp, the commutator and a source of current whereby the lamp is caused to flash once for each movement of the film the length of a picture area, the lamp being mounted on a flexible carrier by which it may be positioned for the inspection of film at selected accessible points in the machine.

5. The combination with a strip of motion picture film having a longitudinal series of picture areas of uniform length and having a corresponding series of perforations, of a machine for the fluid treatment of such film comprising means for advancing the film at a uniform speed, said machine having a plurality of positions at which the film is accessible for inspection and including a sprocket having a series of teeth spaced to engage such perforations, a commutator connected to the sprocket so as to be turned therewith and having a series of contacts corresponding to the teeth of the sprocket, a contact positioned to engage said first contacts momentarily only as they are moved past it, and a circuit including said contacts, a source of current and a lamp, whereby the lamp is activated momentarily at intervals equal to the time taken for the film to be advanced by the length of one picture area.

6. In combination, a strip of motion picture film having a longitudinal series of picture areas of uniform length and having a corresponding series of perforations, a machine for the fluid treatment of such film comprising means for advancing the film at a uniform speed, said machine having a plurality of positions at which the film is accessible for inspection and including a sprocket having a series of teeth spaced to engage such perforations, a commutator connected to the sprocket so as to be turned therewith and having a series of contacts corresponding to the teeth of the sprocket, a contact positioned to engage said first contacts momentarily only as they are moved past it, and a circuit including said contacts, a source of current and a lamp, whereby the lamp is activated momentarily at intervals equal to the time taken for the film to be advanced by the length of one picture area, the lamp being mounted on a movable carrier whereby it may be moved for the examination of film thereby at selected accessible points in the machine.

7. In a machine for treating motion picture film, a series of tanks, means for advancing a continuous strip film at a continuous uniform speed through the series of tanks in succession, whereby a series of visible image changes may take place upon said film, a device for momentarily closing an electric circuit at uniform intervals in timed relation to the movement of the film and a lamp in said circuit and mounted on a movable carrier whereby it may be moved to any of the tanks for the examination of film thereat by the flashing light therefrom, the intervals being sufficiently short to cause images on a viewed film to give a motion picture effect.

8. In the process of treating motion picture film having thereon a series of picture areas of uniform size that comprises passing said film continuously through a series of baths wherein the images undergo continuous visible changes, the method of inspecting the quality of the images at any selected point that comprises illuminating the film momentarily at uniform intervals of time, each interval being that required for a picture area to pass a fixed point, and viewing the film at such point.

Signed at Rochester, New York, this 19th day of August, 1925.

KENNETH C. HICKMAN.